Sept. 12, 1967 F. A. SKANES ET AL 3,341,260
ENDLESS TRACK DRIVE
Filed Nov. 5, 1964 2 Sheets-Sheet 1
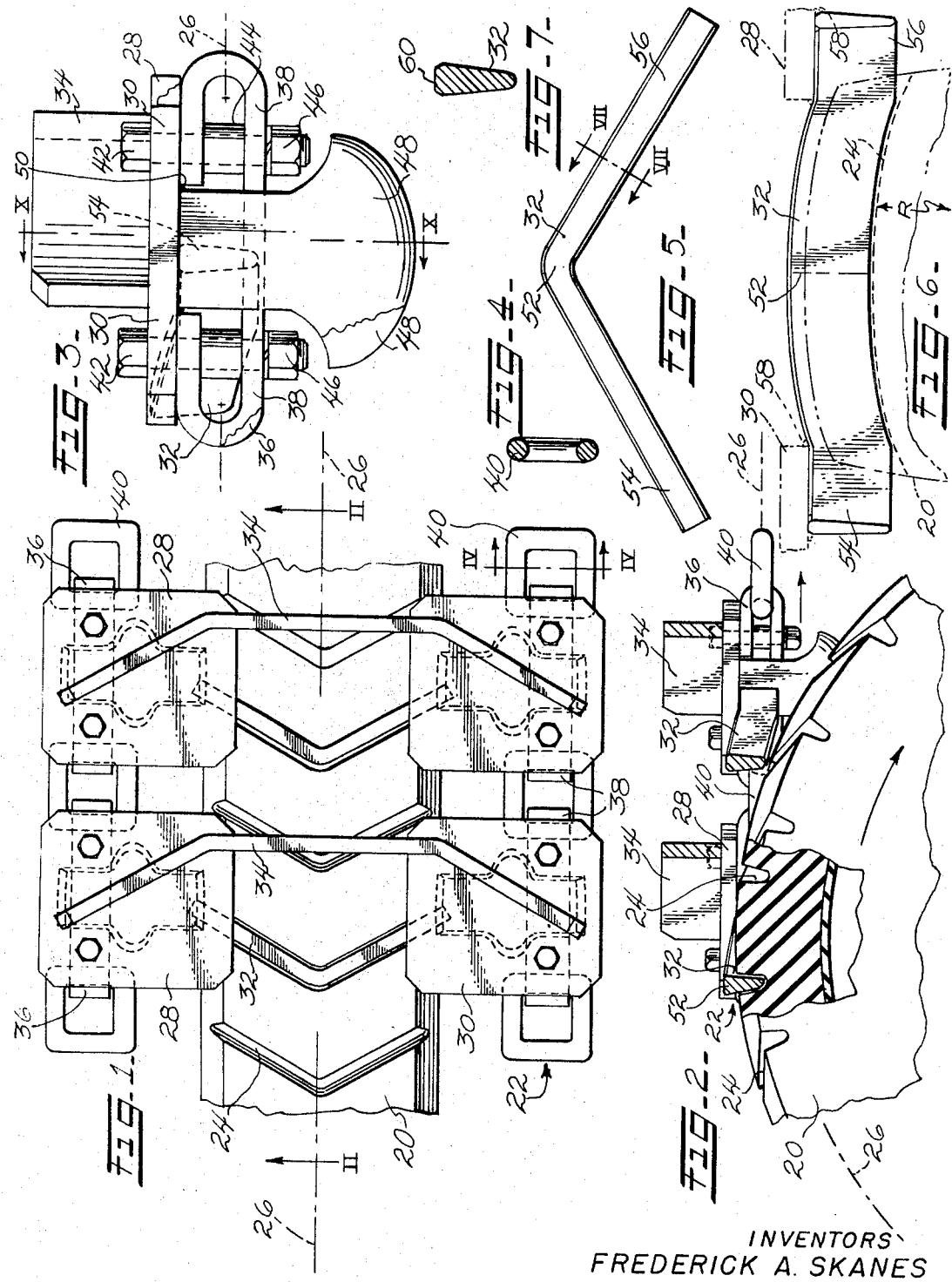
INVENTORS
FREDERICK A. SKANES
ROBERT W. LOGUE
ATT'Y

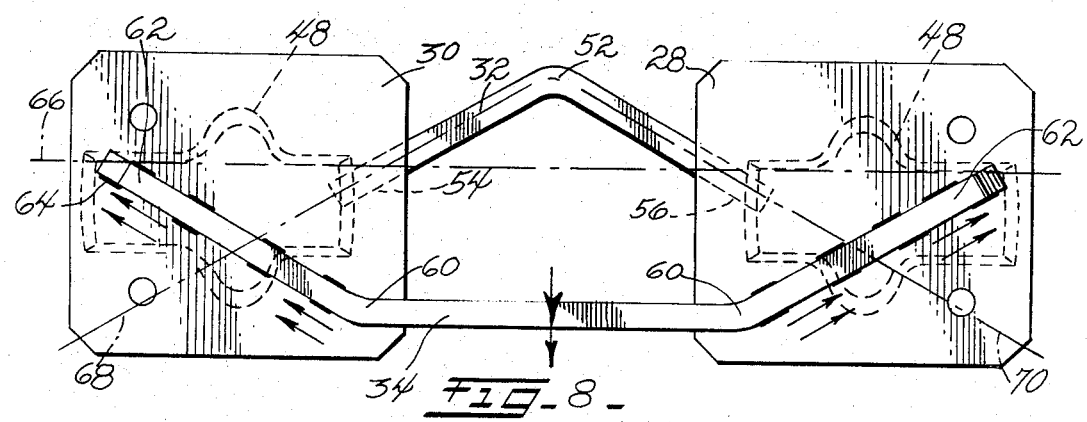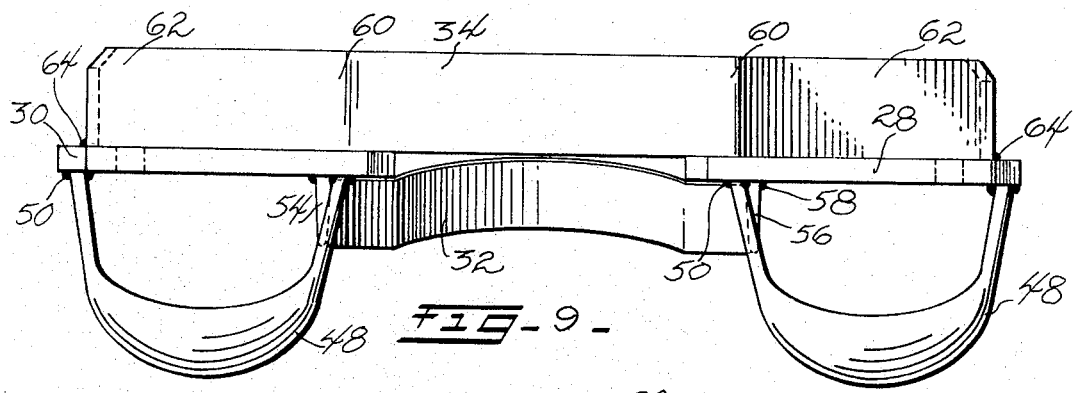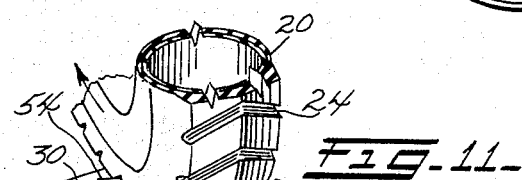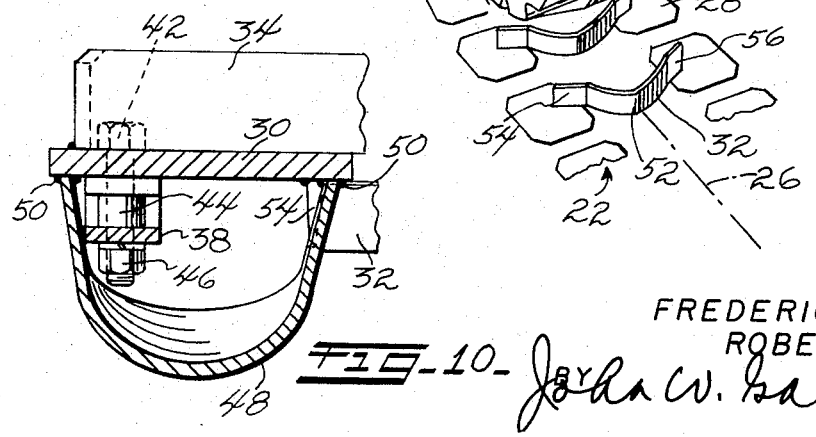

United States Patent Office 3,341,260
Patented Sept. 12, 1967

3,341,260
ENDLESS TRACK DRIVE
Frederick A. Skanes, Burlington, Ontario, and Robert W. Logue, Hamilton, Ontario, Canada, assignors to International Harvester Company, Chicago, Ill., a corporation of New Jersey
Filed Nov. 5, 1964, Ser. No. 409,129
12 Claims. (Cl. 305—13)

This application relates to crawler vehicles, and particularly to the mating shoe and tire of an endles track drive for such vehicles. Crawler vehicles for logging and other uses in wooded terrain are sometimes termed skidders, and the track shoe of our invention is especially applicable to skidders of a type equipped with pneumatic tires.

It is difficult in the field of pneumatic tired, track laying vehicles to design a structure which will uniformly maintain good traction between the track and tires. The difficulty is accentuated in skidders because of the rugged terrain where loose rock, snow, chips or larger chunks of wood, and mud and miscellaneous debris that are commonly encountered may work in between the track and the tires. The track thus fouls in many cases and sometimes a problem arises in attempting to continue operation without throwing the track at one or at both sides of the skidder.

An object of our invention is to provide an articulated, endles type, positive track drive having a mating shoe and tire which materially reduce or substantially eliminate the foregoing difficulty.

A general object is the provision, in an endless track drive such as the foregoing, of a pneumatic drive tire having a chevron or repeating V pattern in the tread, and a track which is formed of complementary mating shoes and which interfits centered and true with the lugs in the tread of the pneumatic tire.

Another object in line with the immediately preceding objective is the provision of a track composed of individual, centrally open track shoes which are linked together. The object of providing in a shoe the exaggerated center opening, as will be explained herein, is to afford the ready discharge or extrusion of the mud, snow, chips, or the like referred to, which become trapped between the track and shoe. The skidder can operate for more extended periods than heretofore, and the open center shoes enable it to run readily over softer ground or in the presence of accumulated trash and loose debris tending to foul the track.

Another object of the invention is the provision, in a positive drive, articulated, endles track assembly, of a pneumatic track-driving tire provided with a chevron tread, and a coacting unitary track shoe having a V-shaped drive bar of which the two diagonal ends are joined to the respective opposite sides of the shoe and the center portion fits complementarily in and fully occupies a receiving groove in the chevron tread. A V-fit results, affording a multiplied area of transverse contact to the direction of running and affording further, when the interengaging apices of the bar and groove point rearwardly to the direction of running, a two point, initial wedging contact forcing the track to center up and run true.

A further object is to provide a fabricated track shoe of which the essential parts consist of a minimum in number, specifically consisting of two crossbars and a pair of spaced side plates joined by the two crossbars.

Another object of the invention, in line with the objectives of the immediately preceding paragraphs, is to provide basically a four-part, fabricated track shoe wherein the crossbars have diagonally extending end portions which internest within one another as seen in plan view of the plates, and which provide optimum geometry in the shoe for rigidity.

Further features, objects, and advantages will either be specifically pointed out or become apparent when, for a better understanding of the invention, reference is made to the following written description, taken in conjunction with the accompanying drawings which show a preferred embodiment hereof, and in which:

FIGURE 1 is an outside plan view of a tire and an upper flight of track shoes embodying the invention;

FIGURE 2 is an elevational showing with the track shoes of the assembly appearing in end view, partially broken away for clarity, along the section lines II—II of FIGURE 1;

FIGURE 3 likewise is an elevational showing, but with an individual shoe shown in end view and shown to an enlarged scale compared with FIGURE 2;

FIGURE 4 is a sectional view of a detail taken along the lines IV—IV of FIGURE 1;

FIGURES 5 and 6 are outside plan and front elevational views of a drive bar as shown principally in dotted lines in FIGURE 3;

FIGURE 7 is a cross-sectional view of the drive bar taken along the section lines VII—VII of FIGURE 5;

FIGURES 8 and 9 are outside plan and front elevational views of the track shoe, with portions of the showings of FIGURES 1 and 2 omitted for clarity;

FIGURE 10 is a view taken along the section lines X—X of FIGURE 3; and

FIGURE 11 is a perspective schematic view with the pneumatic tire and a lower flight of the track assembly being fragmentarily shown to illustrate meshing action of the drive bar in the positive drive herein afforded.

More particularly in FIGURES 1, 2 and 11 of the drawings, a grip-treaded pneumatic drive tire 20 is illustrated which is carried by one of the wheels of a track laying vehicle, not shown, and which supports one end of the flights of an endles, track shoe assembly 22. Normally, the wheel on which the tire 20 is mounted is a driven rear wheel, and one or a series of smooth treaded wheels disposed forwardly thereof, and in conjunction therewith, have the track assembly 22 trained over the wheels in conventional fashion.

A skidder vehicle of the type generally as shown in application Ser. No. 387,352, now Patent No. 3,275,386, is contemplated, in which case the track suspension comprises a track assembly 22 and a series of wheels at one side including the drive tire 20 mounted at the rear, and a duplicate track assembly and series of wheels at the opposite side of the vehicle. The vehicle skids logs, as by towing from a cable, from the site of tree felling to a transport point from which the logs start their trip to the mill.

For ease of analysis, it will be assumed that the vehicle body is jacked up, and that the tire rotation in the several views is clockwise and the direction of circulation or running of the assembly is along its longitudinal axis 26 in an endles path clockwise.

The casing of tire 20 carries a thick tread of chevron lug design, the grooves 24 between lugs being full width grooves across the tread and being spaced apart circumferentially by a predetermined equal distance to provide the uniform groove pitch desired. These grooves 24 are identical V-grooves as viewed in plan, each being arranged with the apex on the longitudinal axis of the assembly and directed rearwardly to the direction of running.

The grooves 24 are each rounded in the floor of the groove, and V-shaped in cross section so that the opposing faces of the adjacent lugs are slightly divergent in the radially outward direction.

Each shoe in the track assembly is basically a four part metal fabrication of two laterally spaced apart, identical flat plates 28 and 30 disposed one at each side of the tread of the tire 20, and a driver 32 and a grouser 34 forming inner and outer cross bars, respectively, which are joined to and which bridge between the plates. Each plate 28 on the flat underside thereof carries a C-shaped link bracket 36 and each plate 30 on its underside carries a similar C-shaped link bracket 38, the brackets being disposed parallel to the longitudinal axis 26 and with their free legs pressing against the plate.

In FIGURES 1, 2 and 4, generally square shaped loops 40 having a circular cross section are provided in pairs, and link together successive track shoes by engaging the successive C-shaped brackets on the respective side plates of adjacent shoes.

In FIGURES 3 and 10, the C-shaped brackets 36 and 38 are each secured at two points to the respective side plates 28 and 30 by means of a pair of bolts 42 each passing consecutively through the associated plate, one of the free legs of the bracket, a spacer sleeve 44, and the body of the bracket. Each bolt 42 is fastened in place by means of a lock washer and nut 46.

Each track shoe carries a pair of radially inwardly directed, tunnel shaped tire guides 48 disposed one at each side of the shoe on the underside of the plate at that side, and serving to engage the sidewall of the tire as a guide whereby, upon initial engagement of the incoming flight of track with the tire, the track assembly will be assisted in running true on the tire. The tire guides 48 are disposed parallel to the longitudinal axis 26 and are individually welded at 50 to the underside of the associated side plate in close relation to the C-shaped bracket and driver 32. More specifically, the tire guide 48 adjacent its outer leg bridges over the C-shaped bracket, and is formed with a slot in its medial leg in which the extreme end of the driver 32 complementarily fits and is tack welded thereto. The side plate in this manner is rigidified against twisting or bending out of a flat plane.

In FIGURES 5 and 6, the driver 32 comprises a crossbar bent so as to be offset in two different directions. It has an obtuse bend 52 at an integral central portion of the bar midway between its ends so as to present an apex, and diagonal opposite end attachment portions 54 and 56 which diverge from one another in the forward direction. The apex of bend 52 is thus offset rearwardly with respect to the direction of running. Moreover, in the other direction of offset, the central portion is offset from the general plane of the driver 32 and of the end attachment portions 54 and 56, along the curve of a crown in the direction of the tension side of the driver, to accommodate the peripheral crown defined by the floor of the groove 24 of the pneumatic drive tire 20.

The driver 32 is welded at 58 along the tension side of its end portions to the tread-facing, underside of the adjacent plates 28 and 30.

The driver 32 has a generally uniform narrow cross section throughout its length, such cross section as best seen in FIGURES 7 having a wedge shape. The outer end 60 is the wide end in section and constitutes the higher loaded tension side of the bar. The wedge shape facilitates action of the driver 32 in wedging itself radially down into the outwardly opening tire tread grooves 24, and in unmeshing itself smoothly when leaving engagement with the grooves. The track assembly has a driver pitch spacing which is twice the measurement of the lug spacing on the tread, and hence alternate grooves are unoccupied.

In FIGURES 8 and 9, the grouser 34 has a pair of intermediate obtuse bends 60 integrally connecting a straight transverse center portion with respective diagonal end attachment portions 62. The outer, ground engaging sides of the plates 28 and 30 and the end attachment portions 62 are welded together at 64.

The end attachment portions of the grouser 34 and driver 32 are inter-nested as seen in the plan view of FIGURE 8. Thus, in the longitudinal sense, the end attachment portions 54 and 56 of the driver cross the transverse plane 66 common to the opposite terminals of the end portions 62 of the grouser. For strength purposes, the geometry is such that the plane 68 of the end portion 54 when extended intersects one end portion 62 substantially at a bisecting point, and the plane 70 of the end portion 56 of the driver 32, when extended, substantially bisects the other end attachment portion 62 of the grouser.

Due to the direction of running indicated by the double headed arrow in FIGURE 8, the oblique end portions 62 operate with a self-cleaning action so that, under ground reaction, the soil moving laterally from the straight center portion of the grouser 34 is urged diagonally outwardly and rearwardly in the direction of the single-headed arrows appearing in FIGURE 8.

When the vehicle is in forward drive, the lower flight of track assembly 22 is moving tangentially along the longitudinal axis 26 when it makes engagement with the tread of the drive tire 20. Initial engagement occurs at laterally spaced apart points on the sides of the tread adjacent the respective end attachment portions 54 and 56 of the driver. The tire lug on the rearward side of the receiving groove 24 wipes in behind the driver with an involute action so as to introduce its transverse driving surface, whereas the crown offset and the rearward offset of the bend 52 in the central portion of the driver temporarily remain out of contact. Thus, friable foreign matter and mud tend to be squeezed rearwardly in the groove as the meshing action progresses.

As the motion of the track 22 transforms from translation into the rotary motion of the tire 20, the entire driver including the bend 52 (FIGURE 2) firmly seats itself in the floor of the receiving groove 24. The space in the groove is thus fully occupied, displacing all mud and material which is squeezed out and discharged. The shoe itself offers no interference to this discharge because of the exaggerated central opening mid-way between the plates 28 and 30 of the shoe.

In leaving mesh between the lugs of the tire tread, the end portions of the driver follow a tangential path along the axis 26 so as to leave the lugs with an involute motion, and then the bent central portion begins a generally radial withdrawal from the groove and disengages from the lug rearward thereto. In the case of reverse drive of the vehicle, the bend 52 at the central portion engages and disengages the tire first, whereas the then trailing diagonal end portions of each driver engage and disengage last. In either case, there is a smooth helical gear action, equivalent to herringbone gearing, meshing and unmeshing, which occurs between the drive tire and the incoming and outgoing flights of track.

It is apparent from the foregoing that the grouser 32 serves a dual function as the traction means and as the sole rigidifying crossbar across the front of the shoe. The other crossbar which is provided, consisting of the driver 32 at the rear, affords quiet running engagement and disengagement with the driving tire because of the progressive helical action of the herringbone type of positive drive. Finally, the widely spaced, large area side plates 28 and 30 afford high flotation action to the vehicle when negotiating muskeg and swamp areas.

As herein disclosed, the invention is shown to incorporate a tire in which only alternate grooves are occupied at any time by the shoe crossbars. It is apparent that, through provision of grooves in a tire always in an odd number, each groove in the tread is vacant for one entire revolution and in fact the associated rearward driving lug will be subjected to wear during only ½ of a revolution per two tire revolutions.

What is claimed is:

1. In a positive drive, articulated, endless track assembly adapted for movement in the forward direction along a longitudinal axis, a unitary, centrally open, metal track shoe for use with a pneumatic track-driving tire provided with a chevron tread, of which the grooves in the tread have a uniform pitch and have the apex rearwardly directed along said longitudinal axis;
said unitary shoe being rigid and comprising:
plates arranged in the plane of the shoe in transversely spaced-apart relation for disposition one at each side of the tread of the tire and having an outer side for ground engagement and an inner side to face the tread; and
outer an inner crossbars between the plates holding them in the spaced apart relation aforesaid, each crossbar having at least one bend between the ends so as to present diagonal end portions and an integral central portion offset in the general plane of the bar from said end portions;
said outer and inner crossbars arranged with their end portions affixed to the plates on the respective outer and inner sides of the latter, and with their central portions offset in opposite directions generally along said longitudinal axis, so that due to a maximum divergence occuring between the central portions of the crossbars, the major dimension of the central opening measured in the longitudinal direction is centered between the plates.

2. In a positive drive, articulated, endless track assembly adapted for movement in a forward direction along the longitudinal axis: unitary, centerally open, track shoes in combination with a pneumatic track-driving tire provided with a chevron tread, of which the receiving grooves in the tread have a uniform pitch and have the apex rearwardly directed along said longitudinal axis, each unitary shoe being rigid and comprising
plates disposed in the plane of the shoe in transversely spaced-apart relation one at each side of the tread of the tire and having and outer side for ground engagement and an inner side facing the tread; and
outer and driving crossbars between the plates holding them in the spaced apart relation aforesaid, each crossbar having at least one bend between the ends so as to present diagonal end portions and an integral central portion offset in the general plane of the bar from said end portions;
said outer and driving crossbars arranged with their end portions affixed to the plates on the respective outer and inner sides of the latter, and with their central portions offset in opposite directions generally along said longitudinal axis, so that the major dimension of the central opening measured in the longitudinal direction increases to a maximum value at the center of the tire tread;
the driving crossbars on successive shoes being spaced apart in proportion to said uniform pitch and being of a complementary fit so that a groove in the tread receiving same will be fully occupied.

3. The invention of claim 1, including pairs of square loops as viewed in plan, the two loops of each pair being associated one at each lateral side of a shoe and each loop linking the plate at that side to the adjacent plate of the next succeeding shoe.

4. In a positive drive, articulated, endless track assembly adapted for movement in a forward direction of circulation along a longitudinal axis, a unitary, centrally open, track shoe for use with a pneumatic track-driving tire provided with a chevron tread, of which the receiving grooves in the tread have a uniform pitch spacing and have the apex rearwardly directed along said longitudinal axis, said unitary shoe being rigid and comprising
two plates disposed in the plane of the shoe in transversely spaced apart relation and having an outer side for ground engagement and an inner side to face the tread; and
outer and inner crossbars between the plates holding them in the spaced apart relation aforesaid, each crossbar having at least one bend between the ends so as to present diagonal end attachment portions and an integral central portion offset in the general plane of the bar from said end portions;
said outer and inner crossbars arranged with their end portions affixed to the plates on the respective outer and inner sides of the latter, and with their central portions mutually offset in a direction generally along said longitudinal axis so that the major dimension of the central opening measured in the longitudinal direction increases to a maximum value midway between the plates;
the diagonal end attachment portions of the inner crossbar projecting through a transverse reference plane passing through the extremities of the diagonal end attachment portions of the outer crossbar.

5. The invention of claim 4, each diagonal attachment portion at the end of the outer crossbar being located so as to be intersected at that end by the plane of the corresponding diagonal end attachment portion of the inner crossbar, when extended;
the outer crossbar being at the front of the shoe, the inner crossbar being at the rear.

6. The invention of claim 5, wherein the inner crossbar is arranged as a drive bar with a rearwardly directed apex and being of a complementary fit so that a receiving chevron groove of the tire tread is fully occupied.

7. The invention of claim 6, said crossbars being further mutually offset in a direction transverse to said longitudinal direction so that at least a major portion of each of the crossbars is on an opposite side of the plane of the shoe from the other, thereby increasing the effective size of the central opening.

8. The invention of claim 7, said drive bar having a generally uniform, narrow cross section of wedge shape of which the outer end is wider and constitutes the higher-loaded tension side of the bar.

9. The invention of claim 8, the central portion of said drive bar being outwardly offset, with respect to the general plane of the bar and the attachment portions, so as to lie along the curve of a crown in the direction of the tension side, to accommodate the peripheral crown of the tire.

10. In a positive drive, articulated, endless track assembly adapted for movement in a forward direction of circulation along a longitudinal axis, a unitary, centrally open, track shoe for use with a pneumatic track-driving tire characterized by a chevron tread providing receiving grooves, said receiving grooves in the tire tread have a uniform pitch spacing and have the apex rearwardly directed along said longitudinal axis, said unitary shoe being rigid and comprising:
two plates disposed in the plane of the shoe in transversely spaced-apart relation and having an outer side for ground engagement and an inner side to face the tread;
outer and inner crossbars between the plates holding them in said spaced-apart relationship, each crossbar having at least one bend between the ends so as to present diagonal end attachment portions and an integral central portion;
said outer and inner crossbars arranged with their end portions affixed to the plates on the respective outer and inner sides of the latter, and with their central portions mutually offset in a direction generally along said longitudinal axis so that the major dimension of the central opening measured in the longitudinal direction increases to a maximum value midway between the plates;
each of the diagonal attachment portions at the ends of the outer crossbar being located so as to be intersected at that end by the plane of the corresponding diagonal end attachment portion of the inner crossbar, when extended;
the diagonal end attachment portions of the inner crossbar projecting through a transverse reference plane passing through the extremities of the diagonal end attachment portions of the outer crossbar, said inner crossbar being arranged as a drivebar with a rearwardly directed apex and being of a complementary fit so that a receiving chevron groove of the tire tread is fully occupied; and two tire guides disposed one at each end of the drivebar and each secured to the drivebar and to the inner face of the plate at that end, whereby the guides and the portions of the drive bar adjacent the end attachment portions thereof effect the initial engagement with the grooved tread with a coaction insuring that the track runs true on the tire.

11. The invention of claim 6, and further comprising two hollow tire guides disposed one at each end of the drive bar and each affixed to the inner face of the plate at that end; and a pair of C-shaped brackets each disposed within and bridged over by a different one of said tire guides, and each affixed to said shoe and presenting opposite loop receiving portions by which each is adapted to be linked to the corresponding C-shaped brackets of the preceding and succeeding track shoes adjacent said shoe.

12. In a shoe adapted for normal forward longitudinal movement as part of a drive-member-driven track assembly, and having a pair of side plates disposed one at each of the extreme opposite sides of the track in transversely spaced apart relation to one another and joined by an inner and an outer crossbar therebetween, the drive member of said track assembly provided with a chevron tread, of which the grooves in the tread open radially outwardly and have the apex rearwardly directed to said movement, the improvement wherein:

an inner crossbar serves to complementarily fit in the radial grooves so as to constitute a drive bar for the assembly;

each said crossbar being bent at an integral central portion thereof between the ends so as to present an apex and diagonal opposite end attachment portions which diverge from one another and from the bent integral central portion, the apexes of said inner and outer crossbars being oppositely directed;

said inner crossbar having a generally uniform, narrow cross-section of wedge shape, of which the outer end is wider and constitutes the higher-loaded tension side of the bar;

the central portion being offset from the general plane of the bar and the attachment portions, along the curve of a crown in the direction of the tension side, to accommodate the peripheral crown of the track drive member.

References Cited

UNITED STATES PATENTS

| | | | |
|---|---|---|---|
| 2,325,690 | 8/1943 | Leguillon | 305—38 |
| 2,739,017 | 3/1956 | Arps | 305—56 X |
| 2,821,443 | 1/1958 | Galanot | 305—56 |
| 2,999,723 | 9/1961 | Ostberg | 305—57 |
| 3,033,050 | 5/1962 | Hisserich | 74—229 |
| 3,107,128 | 10/1963 | Ruane | 305—57 X |
| 3,216,273 | 11/1965 | Colmer | 74—229 X |

FOREIGN PATENTS 873,678   7/1961   Great Britain.

BENJAMIN HERSH, *Primary Examiner.*

RICHARD J. JOHNSON, *Examiner.*